(12) United States Patent
Pribula (10) Patent No.: US 9,566,902 B1
(45) Date of Patent: Feb. 14, 2017

(54) CONTROL CIRCUIT FOR VEHICLE WITH COMPOSITE BRAKE/TURN LIGHTS

(71) Applicant: Custom Dynamics LLC, Youngsville, NC (US)

(72) Inventor: Dave Pribula, Wake Forest, NC (US)

(73) Assignee: Custom Dynamics LLC, Youngsville, NC (US)

( * ) Notice: Subject to any disclaimer, the term of this patent is extended or adjusted under 35 U.S.C. 154(b) by 0 days.

(21) Appl. No.: 14/954,779

(22) Filed: Nov. 30, 2015

(51) Int. Cl.
*B60Q 1/34* (2006.01)
*B60Q 1/44* (2006.01)

(52) U.S. Cl.
CPC ............. *B60Q 1/44* (2013.01); *B60Q 1/343* (2013.01); *B60Q 2400/00* (2013.01)

(58) Field of Classification Search
None
See application file for complete search history.

(56) References Cited

U.S. PATENT DOCUMENTS

| | | | |
|---|---|---|---|
| 3,688,258 A | 8/1972 | Frey | |
| 4,403,210 A | 9/1983 | Sullivan | |
| 5,001,398 A | 3/1991 | Dunn | |
| 5,028,908 A * | 7/1991 | Juang | B60Q 1/44 340/475 |
| 5,264,827 A * | 11/1993 | Giovanni | B60Q 1/38 340/457 |
| 5,353,007 A * | 10/1994 | Gullotti | B60Q 1/38 340/468 |
| 5,477,208 A | 12/1995 | Henderson et al. | |
| 5,900,679 A | 5/1999 | Lake et al. | |
| 6,031,452 A | 2/2000 | Trbovich | |
| 6,371,637 B1 | 4/2002 | Atchinson et al. | |
| 6,714,128 B2 | 3/2004 | Abbe et al. | |
| 7,500,770 B2 | 3/2009 | Medina | |
| 8,588,997 B2 * | 11/2013 | Pribula | B60Q 1/44 180/244 |
| 2005/0062597 A1 | 3/2005 | Su | |
| 2006/0091817 A1 | 5/2006 | Herrig et al. | |
| 2006/0125615 A1 | 6/2006 | Song | |
| 2006/0202812 A1 | 9/2006 | Satoh | |
| 2007/0183152 A1 | 8/2007 | Hauck et al. | |
| 2008/0100432 A1 | 5/2008 | Hoffman | |
| 2009/0051523 A1 | 2/2009 | Perkins | |
| 2009/0174540 A1 | 7/2009 | Smith | |
| 2009/0189756 A1 | 7/2009 | Wu et al. | |
| 2009/0322508 A1 | 12/2009 | Malik | |
| 2010/0102946 A1 | 4/2010 | Polak et al. | |

(Continued)

*Primary Examiner* — Adolf Dsouza
(74) *Attorney, Agent, or Firm* — Coats and Bennett, PLLC (57) ABSTRACT

A control circuit is provided for controlling the warning lights on a vehicle having first and second composite brake/turn lights. The control circuit receives two composite input signals from the vehicle generated by operation of the vehicle's brake and turn signal controls. The control circuit jointly processes the composite input signals to separate the brake and turn indications in order to determine the operational state of the vehicle and generates composite output signals to control the composite brake/turn signals. In one embodiment, a braking pattern is applied to both composite brake/turn signals when the vehicle is braking only. When the vehicle is braking and turning simultaneously, a turn signal pattern is applied to one of the composite brake/turn lights and the other composite brake/turn light is turned on without modulation.

18 Claims, 5 Drawing Sheets

(56) References Cited

U.S. PATENT DOCUMENTS

2010/0171145 A1 7/2010 Morgan et al.
2010/0327747 A1 12/2010 Harris
2011/0291476 A1 12/2011 Pribula et al.

* cited by examiner

CONTROL CIRCUIT FOR VEHICLE WITH COMPOSITE BRAKE/TURN LIGHTS

BACKGROUND

The present disclosure relates generally to warning lights for motor vehicles and, more particularly, to a control circuit for controlling the warning lights on a motorcycle or other vehicle with composite brake/turn lights.

For many years, motor vehicles have been equipped with brake lights and turn lights that illuminate to warn drivers in a trailing vehicle when the leading vehicle is braking or turning. Conventionally, the brake light and turn lights are independently controlled so that braking and turning are indicated respectively by the brake and turn lights. The brake light is turned on continuously when the vehicle is braking and turned off when the vehicle is not braking. The turn lights are turned on and off in a flashing pattern when the vehicle is turning and are turned off otherwise. When the vehicle is braking and turning, the brake lights are turned on continuously and the corresponding turn light is turned on and off in a flashing pattern.

After-market controllers are available to change the normal operation of the warning lights to improve safety. For example, some after-market controllers may cause the brake light to flash according to a pre-determined pattern, and/or illuminate the turn lights when the vehicle is braking. U.S. Pat. No. 8,588,997 (the '997 patent) discloses one such control circuit 10 for controlling the warning lights of a motorcycle or other vehicle.

The controller described in the '997 patent requires three inputs: a run signal, a brake signal, and a turn signal. Some motorcycles currently being offered have composite brake/turn lights rather than separate brake and turn lights. The existing controllers will not operate properly on motorcycles with composite brake/turn lights. Accordingly, there is a need for a new controller to provide enhanced control of the warning lights on vehicles that have composite brake/turn lights.

SUMMARY

The claimed invention relates generally to a control circuit for controlling the warning lights in a vehicle having first and second composite brake/turn lights. The control circuit receives input signals generated by operation of the vehicle's brake and turn signal controls and generates output signals to control the vehicle's warning lights. The input signals include two composite input signals: a composite brake/left turn (BLT) signal and a composite brake/right (BRT) turn signal. The control circuit jointly processes the composite input signals to separate the brake and turn indications and to determine whether the vehicle is braking, turning, or braking and turning simultaneously. If the vehicle is braking without turning, the control circuit applies a brake modulation pattern to first and second composite brake/turn signals. If the vehicle is braking and turning simultaneously, the control circuit applies a turn signal pattern to a first one of the composite brake/turn lights and turns on the other composite brake/turn light without modulation.

In some embodiments, the vehicle may also include a separate brake light. The control circuit may be configured to apply the brake modulation pattern to the brake light if the vehicle is braking only, or braking and turning simultaneously.

DETAILED DESCRIPTION

The present application is directed to a control circuit configured to control the warning lights of a vehicle. The control circuit is specially designed for use on motorcycles that have composite brake/turn lights. Those skilled in the art will appreciate, however, that the control circuit and methods described herein may be applied to other types of vehicles that provide composite brake/turn lights rather than separate brake and turn lights.

Figure 1:
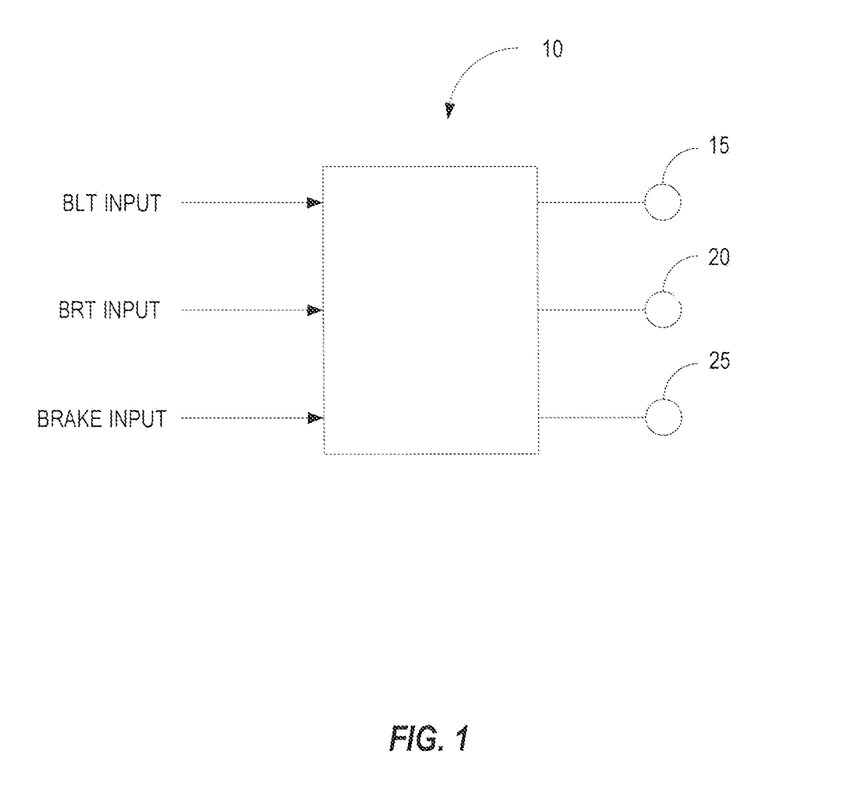
FIG. 1 is a schematic diagram of a warning light system for a vehicle including a control circuit according to embodiments of the present disclosure.

FIG. 1 illustrates a control circuit 10 according to an exemplary embodiment. The control circuit 10 receives input signals generated by operation of the vehicle's brake and turn signal controls and generates output signals to control the vehicle's warning lights. The warning lights include a composite brake/left turn (BLT) light 15 and composite brake/right turn (BRT) light 20. For simplicity, the composite BLT and composite BRT lights are referred to collectively herein as the composite brake/turn (CBT) lights. In some embodiments, the vehicle may also be equipped with a separate brake light or auxiliary brake light 25.

The input signals received by the control circuit 10 include a brake signal and two composite input signals: the brake/left turn (BLT) input signal and the brake/right turn (BRT) input signal. The composite BLT input signal and composite BRT input signal are referred to herein generically as the composite input signals. The brake input signal has a constant low state (L) and a constant high state (H). The composite brake/turn input signals have three states: the constant low (L) state, the constant high state (H), and an alternating high/low (H/L) state. Table 1 below illustrates the states of the input signals for different vehicle operations.

TABLE 1

Input signal states

|  | Brake | BLT | BRT |
| --- | --- | --- | --- |
| Running | L | L | L |
| Braking | H | H | H |
| Left turn | L | H/L | L |
| Right turn | L | L | H/L |
| Brake/left turn | H | H/L | H |
| Brake/right turn | H | H | H/L |

When the vehicle is running without braking or turning, the states of the input signals are low. When the vehicle is braking without turning, the states of the input signals are high, which would normally cause the BLT light 15 and BRT light 20 to illuminate continuously to indicate braking. If the vehicle is equipped with a separate brake light 25, the brake light 25 would also be illuminated. When the vehicle is turning left or turning right without braking, a respective one of the BLT/BRT input signals will be in the alternating high/low (H/L) state, while the brake input signal and other one of the BLT/BRT input signals will be low. In this state, the corresponding CBT light 15, 20 will turn on and off intermittently in a conventional flashing pattern, referred to herein as the turn signal pattern, to indicate that the vehicle is turning. When the vehicle is braking and turning left or right, the brake input signal and one of the BLT/BRT input signals will be high. The other one of the BLT/BRT input signals will be in the alternating high/low (H/L) state to indicate the direction of turning. The other one of the BLT/BRT input signal will be high. In this state, the brake light 25, if present, will turn on and the corresponding CBT light 15, 20 will turn on and off intermittently in a conventional flashing pattern to indicate that the vehicle is turning. The other CBT light 15, 20 will be turned on without modulation to indicate braking.

The main purpose of the control circuit 10 is to apply special effects to the vehicle's warning lights 15, 20, 25 to enhance their effectiveness in alerting other drivers and improve safety. For example, the control circuit 10 may apply predetermined patterns selected by a user to either the brake light 25 and/or CBT lights 15, 20 to increase the likelihood of alerting drivers of other vehicles. In other embodiments, the control circuit 10 may be configured to vary the intensity, color, or other property of the brake and/or turn lights.

In one embodiment, control circuit 10 processes the input signals and generates the output signals to apply special effects to the vehicle's warning lights according to user selected preferences. As part of the processing, the control circuit 10 logically separates the brake and turn indications on the composite input signals to determine the operational state of the vehicle, determines the desired effect for each warning light, and generates the output signals to achieve the desired effect. The output signals generated by the control circuit 10 include a brake output signal and two composite output signals: the BLT output signal and BRT output signal. The brake output signal controls the vehicle's brake light 25 if one is present. The BLT output signal controls the vehicle's composite BLT light. The BRT output signal controls the vehicle's composite BRT light 20.

Figure 2A:
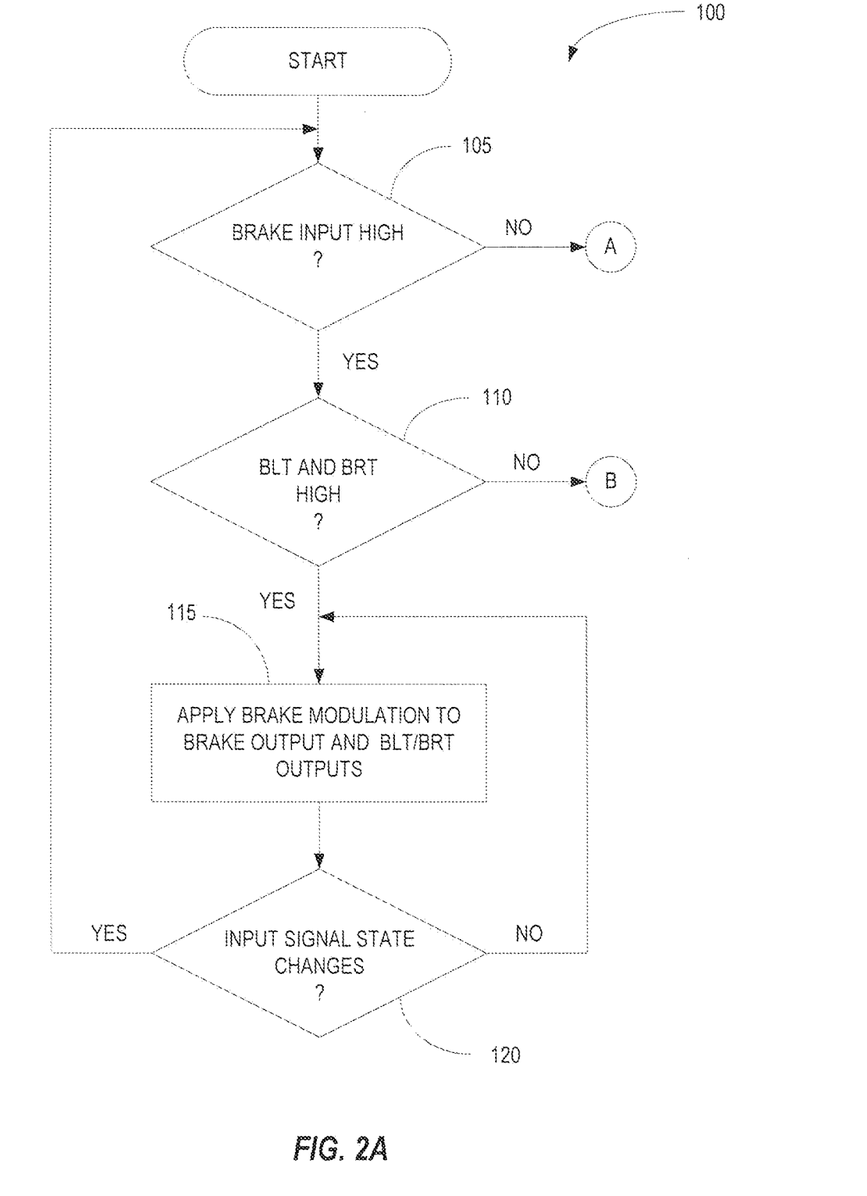
FIGS. 2A-2C comprise a flow diagram illustrating control process implemented by the control circuit for controlling the vehicle's warning lights according to one embodiment.
Figure 2B:
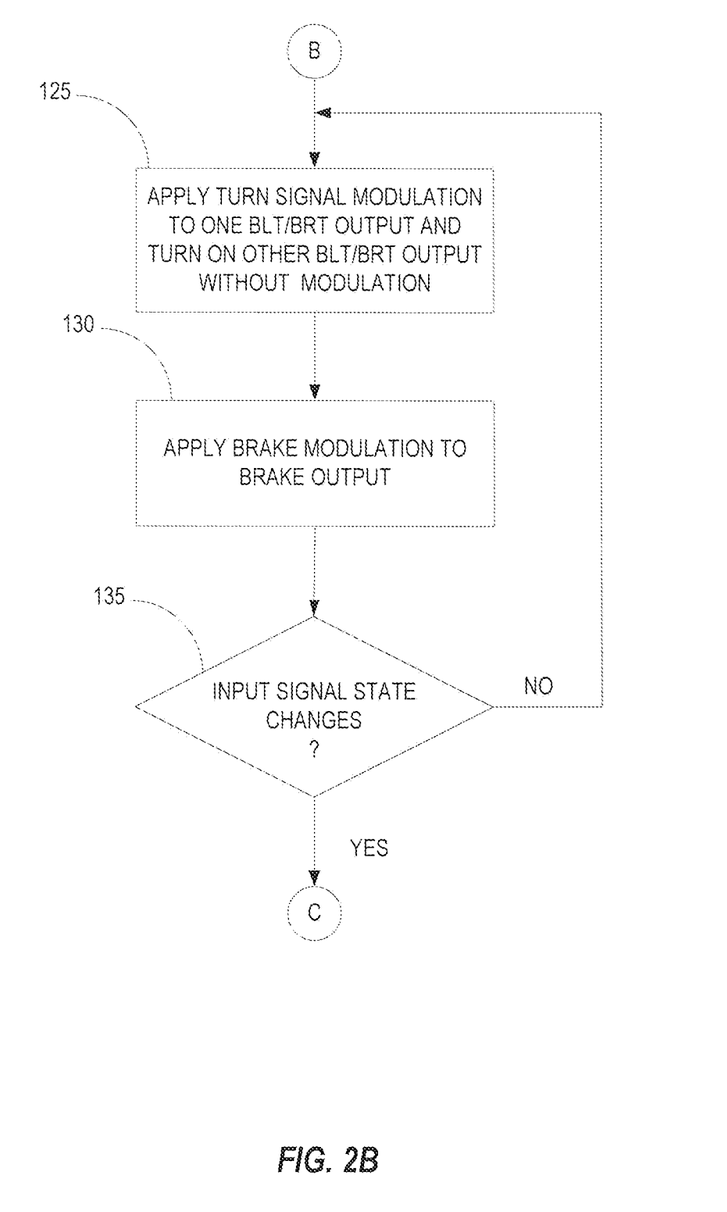
Figure 2C:
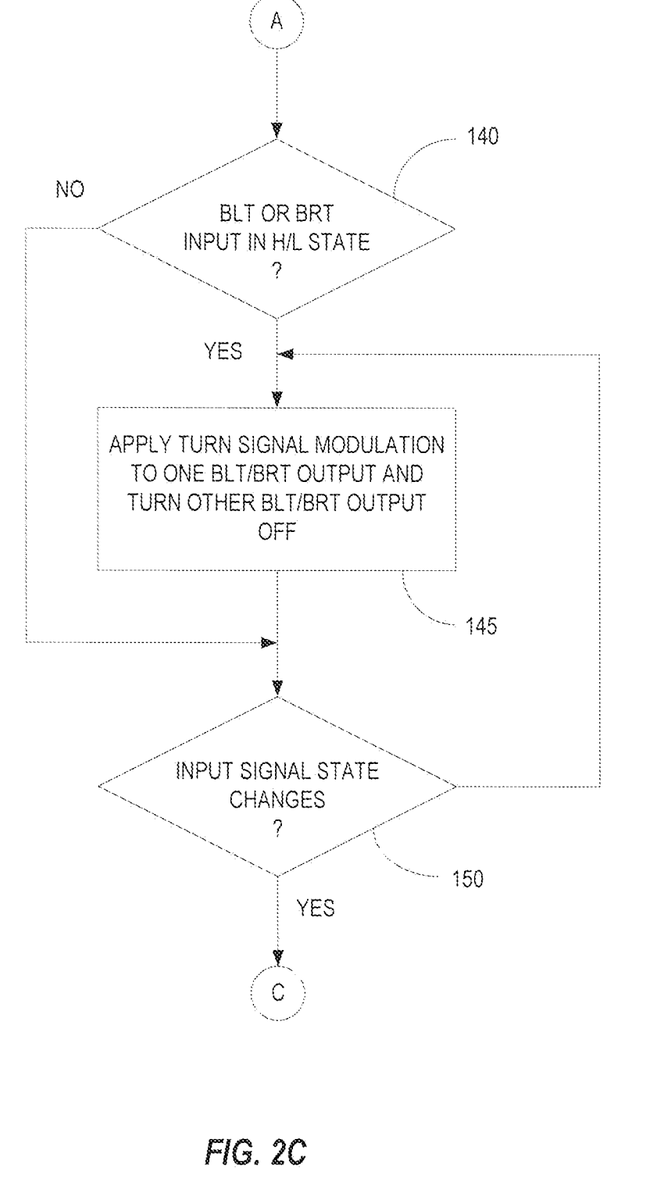

FIGS. 2A-2C illustrate a control process 100 implemented by the control circuit 10 in one exemplary embodiment. It is assumed that, at the start of the control process, all input signals are low. The control circuit 10 initially checks the state of the brake input signal (FIG. 2A, block 105). If the brake input signal is high, the control circuit 10 checks the states of the BLT and BRT input signals (FIG. 2A, block 110). If both the BLT and BRT input signals are constant high, the control circuit 10 determines that the vehicle is not turning. In this case, the control circuit 10 applies a modulation pattern, referred to herein as the brake pattern, to the brake output signal and the BLT/BRT output signals (FIG. 2A, block 115). The brake pattern causes the brake light 25 and CBT lights 15, 20 to turn on and off intermittently in a pre-determined pattern based on the control settings input by the user. In some embodiments, the control circuit 10 may apply a different modulation pattern to the CBT lights 15, 20. For example, the CBT lights 15, 20 could be turned on without any modulation. The control circuit 10 continues to output the brake output signal and BLT/BRT output signals until it detects a change in the input signal conditions (FIG. 2A, block 120). When a change in the condition of the input signals is detected (FIG. 2A, block 120), control returns to the beginning of the control process 100.

If, at block 110, the control circuit 10 determines that one of the BLT/BRT input signals remains high and one is in the alternating high/low (H/L) state, the control circuit 10 determines that the vehicle is braking and turning simultaneously. In this scenario, the control circuit 10 applies the turn signal pattern on a corresponding one of the CBT lights 15, 20, and activates the other CBT light 15, 20 without modulation to avoid confusing other drivers (FIG. 2B, block 125). Additionally, the control circuit 10 may apply the brake pattern to the brake output signal so that the brake light 25 turns on and off according to a predetermined brake pattern selected by a user (FIG. 2B, block 130). The control circuit 10 continues to output the brake output signal and BRT/BLT output signals until it detects a change in the input signal conditions (FIG. 2B, block 135). When a change in the input signal conditions is detected (FIG. 2B, block 135), the control flow returns to the beginning of the control process 100.

If, at block 105, the control circuit 10 detects a constant low voltage on the brake input signal, the control circuit 10 checks the states of the BLT and BRT input signals (FIG. 2C, block 140). If one of the BLT/BRT input signals remains high and the other alternates between high and low, the control circuit 10 determines that the vehicle is turning without braking. In this scenario, the control circuit 10 may apply a turn signal pattern to the corresponding CBT 15, 20 (FIG. 2C, block 145). The other CBT light 15, 20 and the brake light 25 remain off. After activating the turn light, the control circuit 10 waits for a change in the input signal conditions (FIG. 2C, block 150). When a change in the input signal conditions is detected (block 150), the control flow returns to the beginning of the control process 100.

If, at block 140, it is determined that both of the BLT and BRT input signals are low, the control circuit 10 waits for a change in the input signal conditions (block 150). When the control circuit 10 detects a change in the input signal conditions (block 150), control flow returns to the beginning of the control process 100.

It may be noted that each composite brake turn light 15, 20 is controlled as a function of both composite input signals. That is, the BLT light 15 is controlled as a function of both the BLT and BRT input signals. For example, the brake pattern is applied to the BLT light 15 only when the BRT and BLT input signals are both high. Similarly, the BRT light 20 is controlled as a function of both the BLT and BRT input signals.

Figure 3:
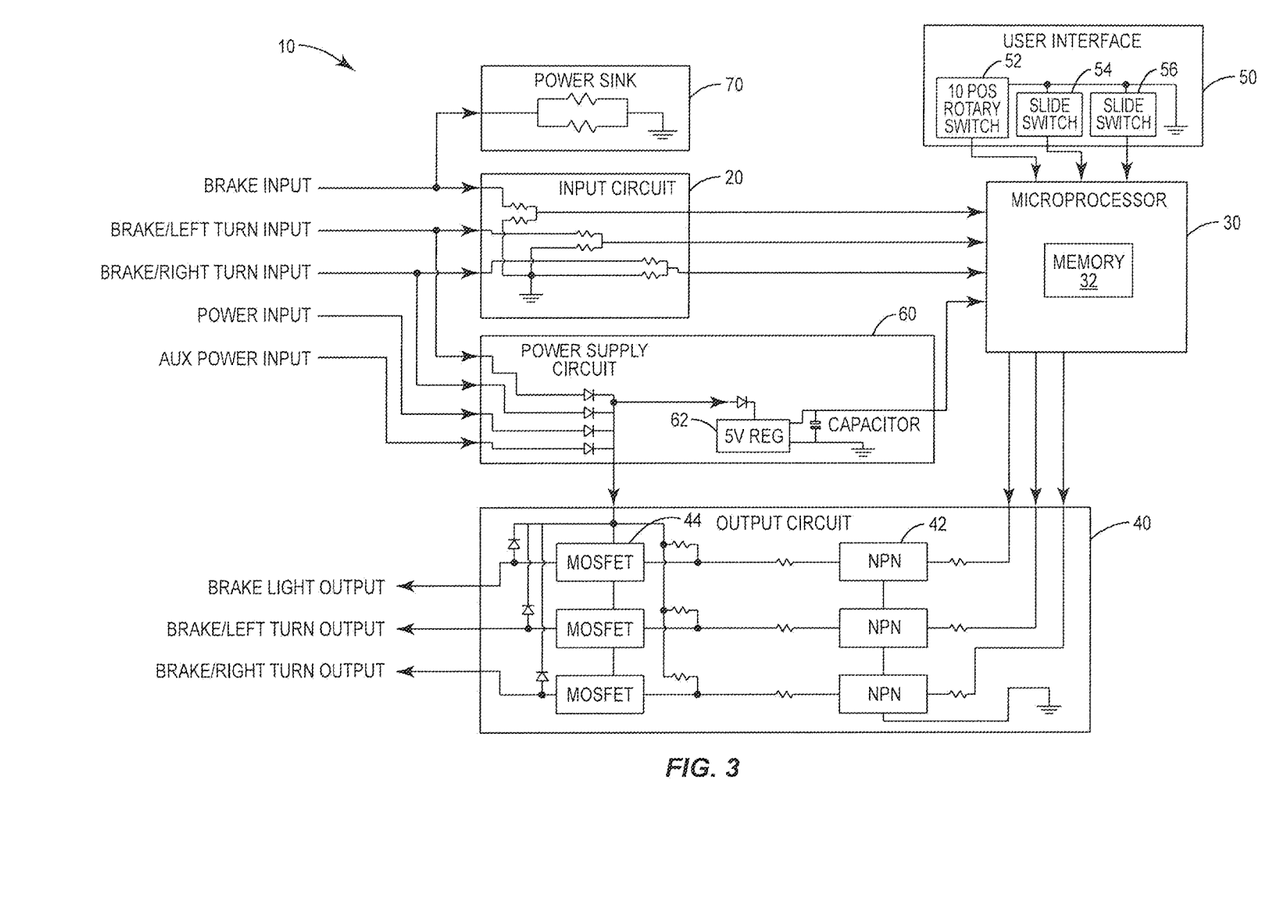
FIG. 3 is an electrical schematic of an exemplary control circuit.

FIG. 3 illustrates the main functional components of the control circuit 10 in one embodiment. The control circuit 10 comprises an input circuit 20, a processing circuit 30, an output circuit 40, a user interface circuit 50, and a power supply circuit 60.

The input circuit 20 receives the input signals generated by operation of the vehicle's brakes and turn signal controls. As previously noted, the input signals include the brake input signal, the BLT input signal, and the BRT signal. The input circuit 20 comprises a voltage divider circuit that changes the voltage level of the input signals to be compatible with the voltage levels required by the processing circuit 30. In one embodiment, the input circuit 20 steps down the voltage from a 12 VDC battery source to a desired voltage level (e.g., 5V DC).

The processing circuit 30 may comprise for example, a microprocessor, hardware circuits, firmware, or a combination thereof. The processing circuit 30 further includes memory 32 for storing program instructions and data needed for operation. For example, the memory 32 may store the brake patterns to be applied based on the settings of the user interface circuit 50. Memory 32 may include read-only memory, random-access memory, flash memory, magnetic or optical storage devices, or a combination thereof. In some embodiments, the memory 32 may be internal to the processing circuit, such as internal memory in a microprocessor. In other embodiments, the processing circuit may comprise discrete memory devices.

The processing circuit 30 receives the input signals from the input circuit 20 after the voltage levels of the input signals are adjusted. The processing circuit 30 also receives control settings from the user interface circuit 50. The processing circuit 30 generates control signals based on the states of the input signals and the control settings input by the user via the user interface circuit 50. In one embodiment, the processing circuit implements the control process as shown in FIGS. 2A-2C.

The output circuit 40 comprises a plurality of switches that generate output signals for controlling the vehicle warning lights responsive to the control signals from the processing circuit 30. The output circuit 40 generates three output signals: the brake output signal, the brake/left turn output signal, and the brake/right turn output signal. The brake output signal controls the illumination of the brake light 25 of the vehicle. The brake/left turn output signal controls the illumination of the brake light 25 and left turn light of the vehicle. The brake/right turn output signal controls the illumination of the brake light 25 and right turn light of the vehicle.

As illustrated in FIG. 3, the output circuit 40 includes two sets of switches 42, 44. In one embodiment, the switches 42 include NPN bipolar transistors and switches 44 include MOSFET switches. Switches 42 may be included in the output circuit 40 to switch the respective MOSFET switches 44 on and off as the processing circuit 30 may not include the necessary drive on its own (e.g. a power output of the processing circuit 30 may not be high enough to turn the MOSFET switches 44 on). The respective MOSFET switches 44 provide the power from the power supply circuit 60 to the warning lights of the vehicle responsive to the control signals from the processing circuit 30.

The user interface circuit 50 comprises one or more controls that allow a user to select the type of modulation or other effects to be applied to the vehicle warning lights. The user interface circuit 50 allows the user to select the modulation patterns or other effects to be displayed by the warning lights for different operating modes. In one embodiment, the user interface circuit 50 comprises a rotary switch 52 and two slide switches 54, 56. Rotary switch 52 enables the user to select braking pattern to apply to the warning lights of the vehicle. The switches 54 and 56 are used to select the warning lights on which the braking pattern is applied. Each switch has two positions. Table 2 below indicates how the brake pattern is applied when the vehicle is braking for different switch settings.

TABLE 2

Effect of switch settings

| State of SW1 | State of SW2 | Apply to |
|---|---|---|
| UP | UP | Brake and turn light |
| UP | DOWN | None |
| DOWN | UP | Brake light only |
| DOWN | DOWN | Turn lights only |

In some embodiments, the user interface 50 may include a wired or wireless interface (not shown) for communicating with others devices. A computing device may be connected to the user interface circuit 50 via the wired or wireless interface. The computing device may include software for configuring the braking pattern and other control settings according to the user's preferences.

The processing circuit 30 determines the position of the rotary switch 52 and slide switches 54, 56 and stores the settings in memory. The user interface 50 may also include other configurations for the user to enter the desired information. Examples include but are not limited to a keypad, touch screen, etc. In one or more embodiments the positions of the rotary switch 52 correspond to available lighting patterns.

A power supply circuit 60 supplies a power to the processing circuit 30 and the output circuit 40 from multiple input sources. The power supply circuit 60 receives voltage inputs from the BLT input, BRT input, as well as a power input and an auxiliary power input. Voltage is supplied from the power supply circuit 60 to the output circuit 40 and to the processing circuit 30. The power supply circuit 60 includes a voltage regulator 62 to maintain a constant voltage level (e.g., 5 VDC) for the processing circuit 30.

Some vehicles include a CAN-bus that enables communication between vehicle components. In these vehicles, a power sink 70 is associated with the brake input. The power sink 70 provides a load on the brake input. Without the power sink 70, the vehicle may interpret the lack of load on the brake input as an indication that the brake light 25 or run light on the vehicle is missing or is not functioning properly. The power sink 70 provides a load to prevent this occurrence. In one embodiment, the power sink 70 includes a pair of parallel 200 Ohm resistors.

Vehicles that include a CAN-bus may also require an auxiliary power input. During certain modes of vehicle operation, a large amount of power is drawn from the CAN-bus. In some circumstances, this large power draw would result in a fault condition which may cause a shutdown of the CAN-bus. To prevent this occurrence, the power supply circuit 60 also draws power from the auxiliary power input. This spreads the power draw and prevents an inadvertent fault condition.

As illustrated in FIG. 3, power is also supplied to the power supply circuit 60 through the BLT input and BRT input. This arrangement provides power the output circuit 40 when the power input and the auxiliary power input do not provide power. This situation may occur when the vehicle is turned off. For example, the warning lights may be activated when the vehicle is turned off to indicate a hazard condition. In such a scenario, the necessary power for these circumstances is drawn through the BLT and BRT inputs.

In use, the control circuit 10 is incorporated into the vehicle wiring system. The control circuit 10 may be included as part of the original vehicle equipment. The control circuit 10 may also be configured to be included into the existing vehicle wiring system of a vehicle. In one embodiment, the control circuit 10 is configured in a wiring harness arrangement. The wiring harness may include one or more connectors that connect into the various inputs and light outputs, such that a technician may install the control circuit 10 using existing connectors of a vehicle power system.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A warning light control circuit for a vehicle having first and second composite brake/turn lights, said control circuit comprising:
    an input circuit configured to receive first and second brake/turn signals;
    a processing circuit to generate control signals based on said first and second composite brake/turn signal(s), said control circuit configured to:
        detect the state of the first and second composite brake/turn signal(s);
        if the first and second composite brake/turn signals are both in a first state, apply a first modulation pattern to first and second control signals that control the first and second composite brake/turn lights respectively;
        if a first one of the composite brake/turn signals is in the first state and a second one of the brake turn signals is in a second state, apply a second modulation pattern to the second control signal that controls the second composite brake/turn light;
    an output circuit including a plurality of switches configured to provide power to the composite brake/turn light(s) responsive to the control signals from the control circuit.

2. The warning light control circuit of claim 1 wherein the first state comprises a constant high state and the second state comprises an alternating high/low state.

3. The warning light control circuit of claim 1 wherein the first modulation pattern causes the composite brake/turn lights to intermittently turn on and off according to a predetermined brake pattern.

4. The warning light control circuit of claim 1 wherein the second modulation pattern causes the second composite brake turn light to intermittently turn on and off according to a predetermined turn signal pattern.

5. The warning light control circuit of claim 1 wherein the processing circuit is further configured to apply a third modulation pattern to the first control signal that controls the first composite brake/turn light if the first one of the composite brake/turn signals is in the first state and a second one of the brake turn signals is in a second state.

6. The warning light control circuit of claim 5 wherein the third modulation pattern causes the first composite brake/turn light to turn on without modulation.

7. The control circuit of claim 1 wherein the processing circuit is further configured to apply the second modulation pattern to the first control signal that controls the first composite brake/turn light if the first composite brake/turn signal is in the second state and the second composite brake/turn signal is in a third state.

8. The control circuit of claim 7 wherein the processing circuit is further configured to generate a second control signal to turn off the second composite brake/turn light if the first composite brake/turn signal is in the second state and the second composite brake/turn signal is in the third state.

9. The control circuit of claim 1 wherein the vehicle includes a brake light and wherein the processing circuit is further configured to apply the first modulation pattern to a third control signal that controls a brake light if:
    the first and second composite brake/turn signals are both in a first state, or
    a first one of the composite brake/turn signals is in the first state and a second one of the brake turn signals is in the second state, apply the first modulation pattern to the second control signal that controls the second composite brake/turn light.

10. A method of controlling warning lights in a vehicle having first and second composite brake/turn lights, said method comprising:
    receiving first and second composite brake/turn signals;
    detecting the states of the first and second composite brake/turn signal(s);
    generating first and control signals based on the detected states of first and second composite brake/turn signal(s), said generating comprising:
        if the first and second composite brake/turn signals are both in a first state, applying a first modulation pattern to first and second control signals that control the first and second composite brake/turn lights respectively;
        if a first one of the composite brake/turn signals is in the first state and a second one of the brake turn signals is in a second state, applying a second modulation pattern to the second control signal that controls the second composite brake/turn light;
    controlling the composite brake/turn lights responsive to the control signals.

11. The method of claim 10 wherein, the first state comprises a constant high state and the second state comprises an alternating high/low state.

12. The method of claim 10 wherein, the first modulation pattern causes the composite brake/turn lights to intermittently turn on and off according to a predetermined brake pattern.

13. The method of claim 10 wherein the second modulation pattern causes the second composite brake turn light to intermittently turn on and off according to a predetermined turn signal pattern.

14. The method of claim 10 further comprising, applying a third modulation pattern to the first control signal that controls the first composite brake/turn light if the first one of the composite brake/turn signals is in the first state and the second one of the brake turn signals is in a second state.

15. The method of claim 14 wherein, the third modulation pattern causes the first composite brake/turn light to turn on without modulation.

16. The method of claim 10 further comprising, applying the second modulation pattern to the first control signal that controls the first composite brake/turn light if the first composite brake/turn signal is in the second state and the second composite brake/turn signal is in a third state.

17. The method of claim 16 further comprising, generating a second control signal to turn off the second composite brake/turn light if the first composite brake/turn signal is in the second state and the second composite brake/turn signal is in the third state.

18. The method of claim 10 wherein the vehicle includes a brake light and further comprising, applying the first modulation pattern to a third control signal that controls a brake light if:
    the first and second composite brake/turn signals are both in a first state, or
    a first one of the composite brake/turn signals is in the first state and a second one of the brake turn signals is in the second state, apply the first modulation pattern to the second control signal that controls the second composite brake/turn light.

* * * * *